United States Patent [19]

Rhodes

[11] 4,338,579
[45] Jul. 6, 1982

[54] FREQUENCY SHIFT OFFSET QUADRATURE MODULATION AND DEMODULATION

[75] Inventor: Smith A. Rhodes, Falls Church, Va.

[73] Assignee: Communications Satelite Corp., Washington, D.C.

[21] Appl. No.: 173,559

[22] Filed: Jul. 30, 1980

[51] Int. Cl.³ .................. H04L 27/12; H04L 27/14
[52] U.S. Cl. ........................................ 332/21; 329/50;
329/105; 329/112; 329/126; 332/22; 332/23 R;
375/62; 375/89; 375/110
[58] Field of Search ............... 329/50, 105, 110, 112,
329/126, 128; 332/16 R, 16 T, 21, 22, 23 R;
375/62, 64, 67, 83, 88, 89, 90, 106, 110, 111, 113

[56] References Cited

U.S. PATENT DOCUMENTS

| | | | |
|---|---|---|---|
| 4,006,418 | 2/1977 | Liskov et al. | 332/21 X |
| 4,097,813 | 6/1978 | Otani et al. | 329/110 X |
| 4,158,105 | 6/1979 | Otani et al. | 375/106 X |
| 4,281,412 | 7/1981 | Wissel et al. | 329/112 X |

*Primary Examiner*—Siegfried H. Grimm
*Attorney, Agent, or Firm*—Sughrue, Mion, Zinn, Macpeak and Seas

[57] ABSTRACT

A Frequency Shift Offset Quadrature (FSOQ) signal which is a constant envelope frequency-shift keyed version of an offset quaternary phase shift keyed (O-QPSK) transmission is provided. A technique for generating an FSOQ signal in a manner similar to O-QPSK by modulating offset quadrature channels with selectable pulse shapes which yields the desired 3-tone continuous phase FSK approximation of O-QPSK is disclosed. Receiver synchronization circuits are also provided which enable FSOQ to be detected as a special case of O-QPSK, whereby the detection performance of synchronous coherent QPSK, rather than the relatively inferior performance of FSK detection, is obtained. FSOQ provides a constant envelope and requires less bandwidth than minimum shift keying (MSK).

20 Claims, 12 Drawing Figures

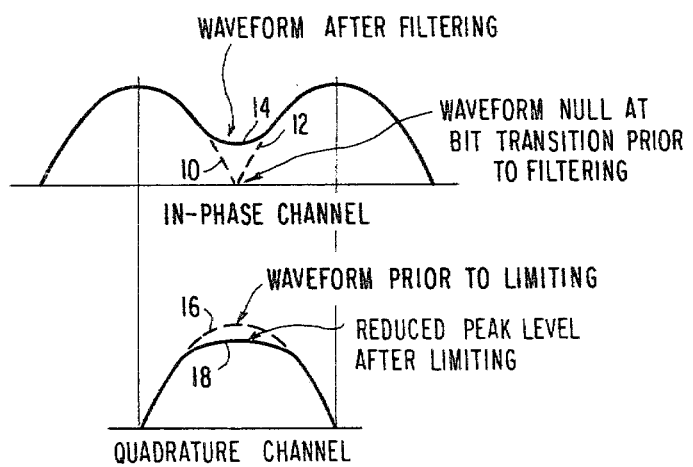
FIG.1
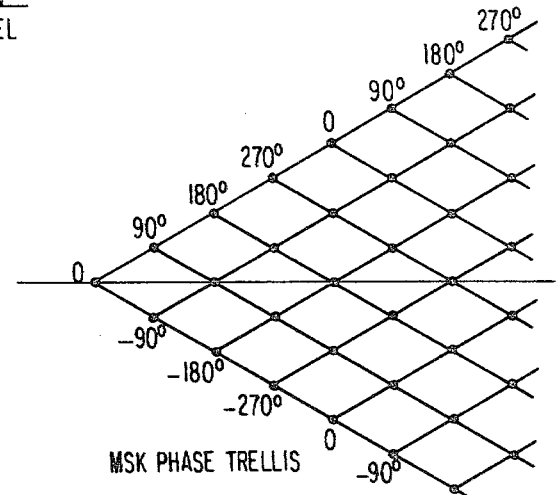
FIG.2
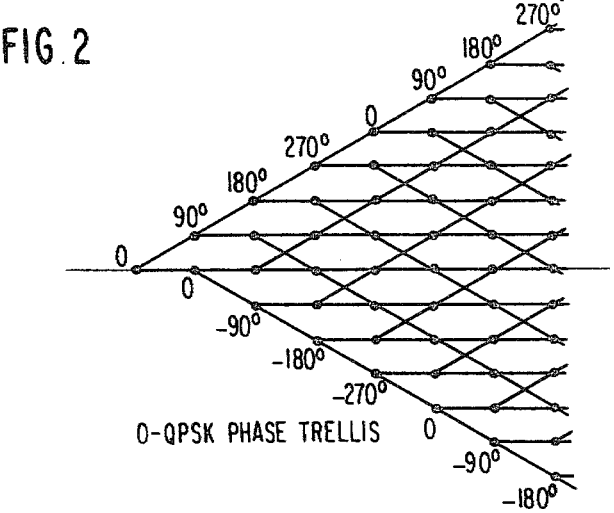

| PULSE NUMBER | REGIONS 1 | REGIONS 2 | REGIONS 3 | SHAPES* IN REGIONS 1 | 2 | 3 | NORMALIZED DISTANCE |
|---|---|---|---|---|---|---|---|
| 0 | | | | R | R | R | 1.0000 |
| 1 | | | | R | R | S | 0.9170 |
| 2 | | | | R | S | R | 1.1482 |
| 3 | | | | R | S | S | 1.0766 |
| 4 | | | | S | R | R | 0.9170 |
| 5 | | | | S | R | S | 0.8257 |
| 6 | | | | S | S | R | 1.0766 |
| 7 | | | | S | S | S | 1.0000 |

\* R = RECTANGULAR, S = SINUSOIDAL

FIG. 7

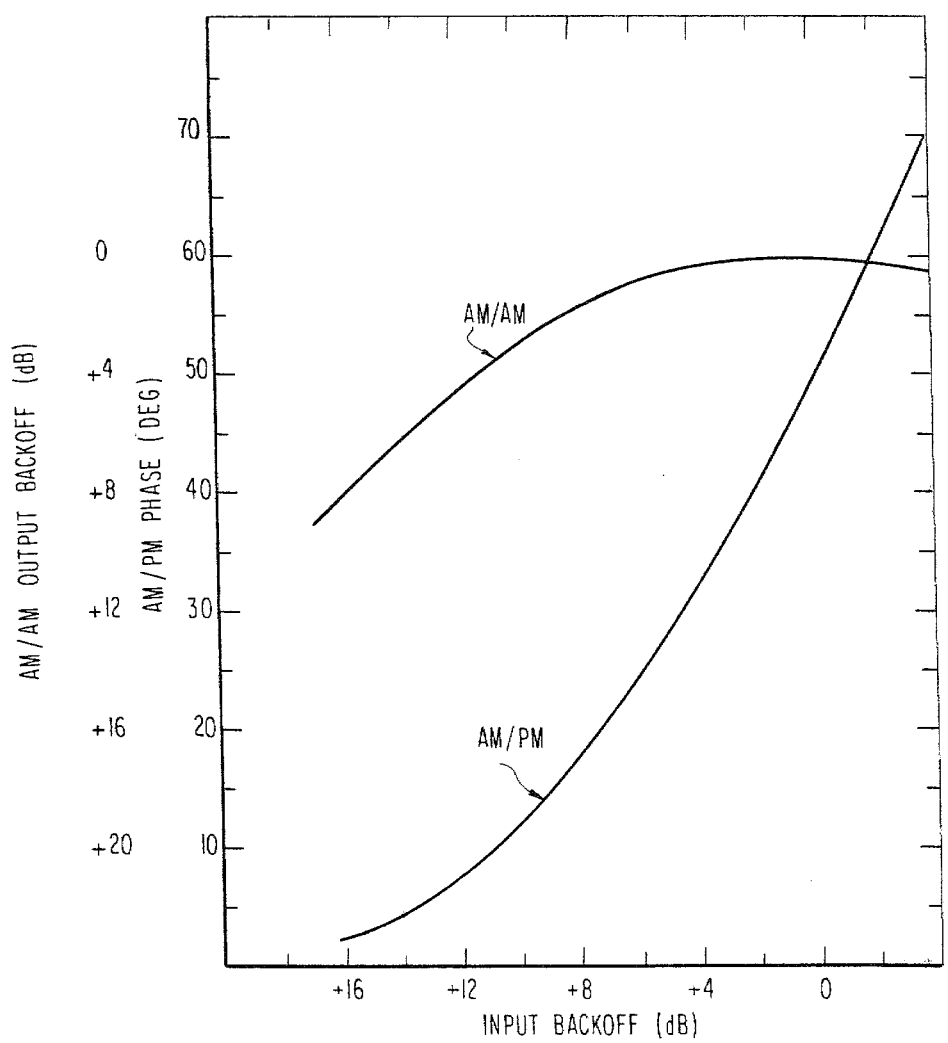
FIG. 9 — HPA TRANSFER CHARACTERISTICS

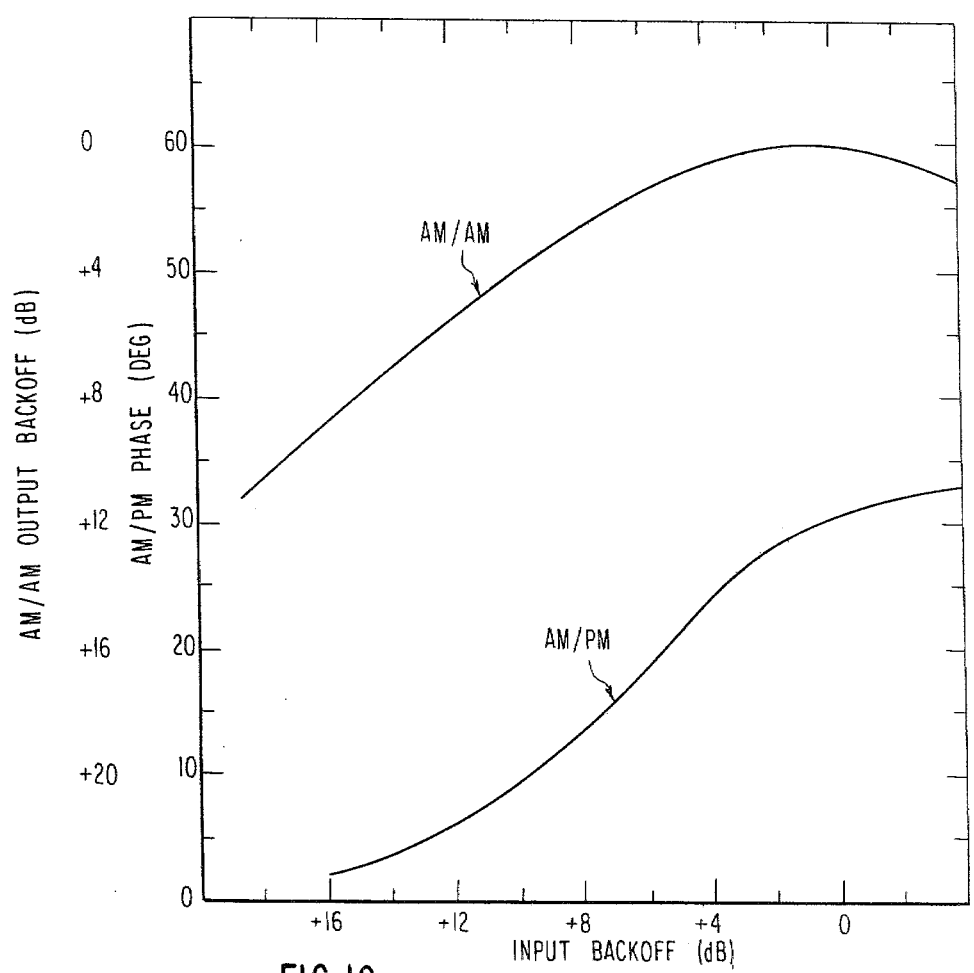
FIG.10 — TWTA TRANSFER CHARACTERISTICS
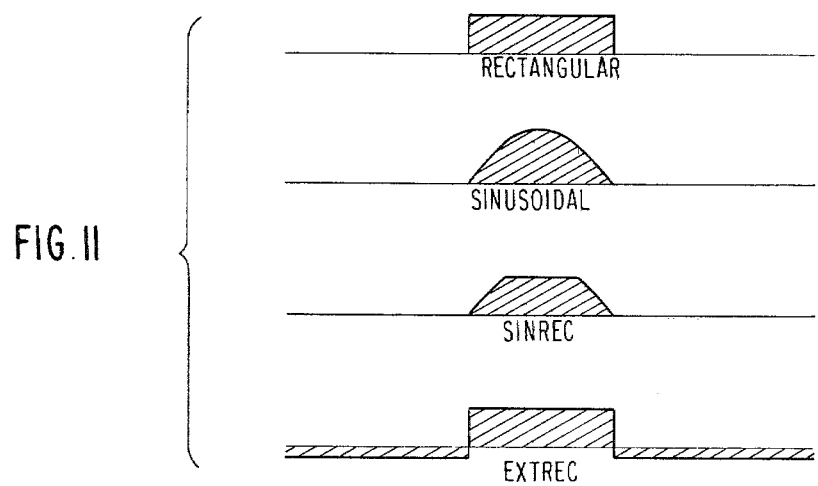
FIG.11

FREQUENCY SHIFT OFFSET QUADRATURE MODULATION AND DEMODULATION

BACKGROUND OF THE INVENTION

The present invention relates to a communication modulation technique, and finds particular utility in satellite communications.

Various modulation techniques may be employed for modulating a satellite communications signal. A brief discussion of several of these techniques follows.

QPSK

Conventional quaternary phase shift keying (QPSK) is usually generated and detected as the sum of two quadrature carriers that are modulated separately by bit sequences which are coincident in time alignment.

O-QPSK

Offset quaternary phase shift keying (O-QPSK) differs from QPSK only in that the binary modulation sequences for the quadrature carriers are relatively staggered in time by one half of a quaternary symbol interval.

MSK or FFSK

Minimum shift keying (MSK) and fast frequency shift keying (FFSK) are generated and detected as O-QPSK with half cycle sinusoidal pulse shapes for the two staggered modulation bit sequences. The pulse shaping results in binary FM with a modulation index of 0.5 or, equivalently, continuous phase FSK with M=2 signaling tones. For an explanation of the generation of MSK signals as O-QPSK with half cycle sinusoidal shaping of pulses, and the subsequent synchronization, demodulation and bit detection for MSK, reference is made to co-pending U.S. patent application Ser. No. 178,411, filed Aug. 15, 1980, "New Synchronizer for MSK Burst Communications", by Smith Albert Rhodes.

TFM

Tamed FM (TFM), as described in the article by Frank deJager and Cornilous B. Dekker, entitled "Tamed Frequency Modulation, A Novel Method To Achieve Spectrum Economy in Digital Transmission", IEEE Transactions on Communications, Volume COM-26, No. 5, May 1978, pages 534 through 542, is a constant envelope approach to QPSK which results in digital FM with several signaling tones. The FM signal is generated in accordance with a phase function which is correlated over several bit intervals. Hence the bandwidth is constrained to be less than that of MSK. Note that the correct phase function for TFM is obtained indirectly by suitable modulation of an FM generator.

At present, conventional QPSK is the most popular modulation for Time Division Multiple Access (TDMA) sateltite communications. For TDMA, the transponders must be operated near power saturation in order to effectively utilize satellite power. Thus, the channel is nonlinear. Signal distortion from the nonlinearity causes a loss in detection performance by creating in-band impairments and adjacent-channel interference. Significant signal impairment can be avoided only by the transmission of a signal which has a nearly constant envelope under band-limited conditions.

MSK is a 2-tone FSK signal with continuous phase that has tones above and below the carrier frequency $f_c$ by $R_b/4$, where $R_b$ is the modulation bit rate. Thus, MSK is actually binary FM with a modulation index of 0.5. Since the frequency must be at either $f_c+R_b/4$ or $f_c-R_b/4$, MSK always changes phase relative to $f_c$ by $+\pi/2$ radians or $-\pi/2$ during each bit interval. However, O-QPSK either shifts by $\pm\pi/2$ radians or keeps the same phase. Therefore, an FSK or digital-FM version of O-QPSK has three signalling tones, the MSK tones at $f_c+R_b/4$ and $f_c-R_b/4$ that are used for phase shifts of $\pm\pi/2$ radians, and a tone at $f_c$ to allow a zero phase shift.

Because of its constant envelope, MSK is useful for single-signal transmission over a nonlinear channel, such as in TDMA satellite communications. However, MSK requires about 50 percent more bandwidth than QPSK. Hence, MSK is not a feasible alternative to QPSK if the transponder frequency spacing $B_c$ is very tight relative to the quaternary symbol rate $R_s$. For instance, INTELSAT-V is planned to have 120 Mbit/s TDMA/QPSK with a channel spacing of $B_c=80$ MHz, for a $B_c/R_s$ ratio of 1.33. Efficient MSK communications requires a $B_c/R_s$ of at least 2.0 for good detection performance.

Since both binary channels can change states simulataneously for conventional QPSK, the transmission can undergo polarity transitions or phase shifts of $\pi$ radians. Envelope nulls occur for a filtered signal in regions of polarity transitions. Staggering of the binary components for offset QPSK prevents the $\pi$ phase shifts that cause large envelope variations. However, filtered O-QPSK transmissions can still have significant envelope fluctuations in the regions midway between sampling points for each binary component. With the staggered timing, midway between two sample points on one channel corresponds to a sampling point for the other channel. The nonlinearity due to power saturation and the resulting envelope limiting introduces an interaction between the two components. Hence, cross-coupling interference between the two components results in scattering of the component values about their means at the sampling points.

Cross-coupling that results from envelope limiting can be either constructive or destructive. Whenever the magnitude of a binary modulation component is small in the regions between sampling points, the magnitude of the other component will be enhanced at the sampling instances by envelope limiting. Again, MSK is a special form of O-QPSK that has half-cycle sinusoidal pulse shaping. At the expense of increased spectral occupancy, this pulse shape yields nulls midway between sampling points.

Filtering of any type introduces intersymbol interference that causes the binary modulation components to have variable amplitude in the regions between sampling points. The amplitude of each component is pattern sensitive. Consequently, it is equally likely that the amplitude is enhanced or attenuated by intersymbol interference. It follows that the cross-coupling interference caused by envelope limiting is equally likely to be constructive or destructive. However, the bit error probability is a nonlinear function that is affected more by destructive interference than by constructive interference. Therefore, detection performance is degraded by the cross-coupling interference at the sampling instant.

It should be noted that Nyquist filtering used to produce intersymbol interference nulls at the sampling instants maximizes the intersymbol interference midway between sample points. Whereas this intersymbol interference pattern is acceptable for conventional QPSK, Nyquist filtering causes large cross-coupling interference at the sampling instances for O-QPSK transmitted over a nonlinear channel. This is the reason why O-QPSK gives detection performance that is usually inferior to that of conventional QPSK for a nonlinear channel when Nyquist filtering is employed. It is possible to obtain intersymbol interference nulls both at the sampling points and midway between, but this requires Nyquist filtering with 100 percent roll-off or 100 percent "excess bandwith." Then, the bandwidth requirement is about the same as for MSK.

O-QPSK has the same power spectrum as conventional QPSK. Thus, the bandwidth requirements for O-QPSK and conventional QPSK are identical for a linear channel. The nonlinearity associated with operation near power saturation changes the spectrum of both forms of modulation. For conventional QPSK that has been filtered to impose a bandwidth restriction, the nonlinearity causes the spectral sidelobes to regrow to almost their unfiltered levels. Adjacent channel interference can be a problem if these sidelobes are not suppressed by filtering of the output of the nonlinear device. Staggering of the time alignments of the binary components prevents the spectral regrowth for O-QPSK, but the main spectral lobe is somewhat widened by the nonlinearity. Consequently, offset QPSK usually requires slightly more bandwidth than conventional QPSK for efficient communications over a nonlinear channel.

SUMMARY OF THE INVENTION

An object of the present invention is to obtain a constant envelope frequency shift keyed version of an O-QPSK transmission signal to thereby provide a Frequency Shifted Offset Quadrature signal (FSOQ).

It is a further object of the present invention to provide an apparatus for generating the FSOQ transmission signal in a manner similar to O-QPSK by modulating staggered quadrature channels with selectable pulse shapes which yield the desired three tone continuous-phase FSK approximation of O-QPSK.

It is a further object of the present invention to provide an apparatus for the detection of the FSOQ signal, the apparatus obtaining the detection performance of synchronous coherent QPSK rather than the relatively inferior performance of FSK detection. Synchronization circuits are provided which enable FSOQ to be detected as a special case of O-QPSK.

It is a further object of the present invention to obtain a constant envelope FSOQ signal which requires less bandwidth then the MSK technique.

Briefly, a new modulation technique is disclosed which provides a constant envelope, which is a useful property for signals which are to be transmitted through nonlinear channels. The modulation in accordance with the present invention is a digital FM version of O-QPSK. If generated and detected as digital FM, this transmission signal would be referred to as continuous phase M'ary frequency shift keying (MFSK) with M=3 signaling tones. However, the transmission must be generated as a special form of O-QPSK in order to be suited for high speed applications. Good detection performance requires that the signal be detected as a special case of O-QPSK. With generation and detection as a special case of O-QPSK, the modulation will be termed "FSOQ", for Frequency Shift Offset Quadrature modulation.

Use of frequency shifts to change phase linearly provides constant envelope for FSOQ. Also, the magnitude of either quadrature component of FSOQ midway between sample points never exceeds the magnitude of the other component at its sample point. Therefore, the cross-coupling problem of offset QPSK with Nyquist filtering and a nonlinear channel is avoided by the pulse shapes of FSOQ.

For FSOQ, the two MSK tones at $R_b/4$ above and below the center tone are never used in succession. This signalling constraint definitely makes the bandwidth requirement for FSOQ less than that for MSK. While the exact bandwidth requirements for FSOQ have not been conclusively determined, it appears that FSOQ is not as bandwidth efficient as QPSK.

Use of frequency shifting for FSOQ results in phase shifts that take place linearly with time rather than the instantaneous phase shifts that occur for offset QPSK in the absence of a bandwidth constraint. The gradual phase shift reduces the minimum distance or separation between signalling vectors. Hence, with ideal coherent detection over a channel that is perfect except for additive Gaussian noise, FSOQ will not yield the detection performance of QPSK. However, in a bandwidth limited channel, both conventional and offset forms of QPSK suffer signal distortion that lowers the minimum distance, also. Thus, the possible advantages of FSOQ can be realized only for channels that introduce significant transmission impairments.

A modulator is disclosed for generating FSOQ as O-QPSK with special pulse shaping of the staggered quadrature modulation components. The pulse shape varies in a nonlinear fashion that is dependent upon the values of the last four modulation bits. Consequently, the pulse shaping is implemented with switching between different pulse shapes rather than by the usual linear method that utilizes the principle of superposition.

An O-QPSK demodulator is also disclosed for the detection of FSOQ. Filtering prior to detection is optimized by matching to the FSOQ pulse shape that has the least energy. Symbol synchronization and carrier synchronization may be readily obtained from circuits that employ tuned filters at harmonics of the three FSOQ tones. A synchronizer circuit is also shown.

BRIEF DESCRIPTION OF THE DRAWINGS

FIG. 1 is an illustration of the in-phase and quadrature channel signals showing the effect of tight filtering and envelope limiting on MSK;

FIG. 2 is an illustration of the MSK and O-QPSK phase trellises;

FIG. 7 is an illustration of the eight FSOQ bit waveforms and the associated normalized distances;

FIG. 9 is a graph illustrating an assumed high powered amplifier transfer characteristic;

FIG. 10 is a graph illustrating an assumed traveling wave tube amplifier transfer characteristic;

FIG. 11 is an illustration of impulse responses for weighted integrate and dump filters;

DETAILED DESCRIPTION OF THE INVENTION

In order to appreciate the advantage of FSOQ, it is first necessary to understand the problems associated with MSK with respect to bandwidth requirement. Note in FIG. 1 that the half-cycle sinusoidal shaped pulses 10 and 12 for each quadrature component of MSK pass through zero when the other component waveform 16 peaks resulting in discontinuity of slope at a null of one of the quadrature modulation components. The frequency content of the slope discontinuity is very large and therefore requires a wide spectral bandwidth. Filtering to reduce the bandwidth will smear adjacent pulses together and thereby cause the null to vanish as shown at waveform 14. Loss of the null is not harmful if the channel is linear but envelope limiting that results from operating the satellite transponder at power saturation results in the peak power being shared by the two quadrature components. Thus, the voltage of the component where the null was located is taking power away from the other component at its peak location thus producing waveform 18. A bandwidth constraint below a $B_cT_s=2$, where $B_c$ is the transponder frequency spacing and $T_s=2/R_b$ is a "quaternary" signalling interval, causes too much power to be stolen from the pulse peaks by the removal of nulls. Also, such tight filtering destroys the constant envelope property of MSK.

FIG. 2 compares the phase trellises for O-QPSK and MSK. One MSK tone causes a 90° phase increase during a bit interval, while the other tone causes a 90° decrease. However, the phase of O-QPSK does not change during a bit interval unless there is a bit transition for one of the binary modulation components. When a transition occurs, the phase shift will be $+90°$ or $-90°$ depending upon the present bit value and the previous phase position.

FSOQ uses the center tone at $f_c$ to provide the zero phase shift of O-QPSK. The other two tones at $f_H=f_c+R_b/4$ and $f_L=f_c-R_b/4$ are the same tones used by MSK. These tones are required in FSOQ to yield the $\pm 90°$ phase shifts associated with bit transitions. FSOQ is generated and detected as O-QPSK with pulse shapes that determine the frequency. During any interval of zero phase shift, the tone at $f_c$ is chosen by selecting rectangular pulse shaping. Frequency shifts with a tone at $f_H$ or $f_L$ are generated by the use of sinusoidal pulse shaping. Bit values are conveyed by the polarities of the pulses.

Generation of FSOQ

Figure 3:
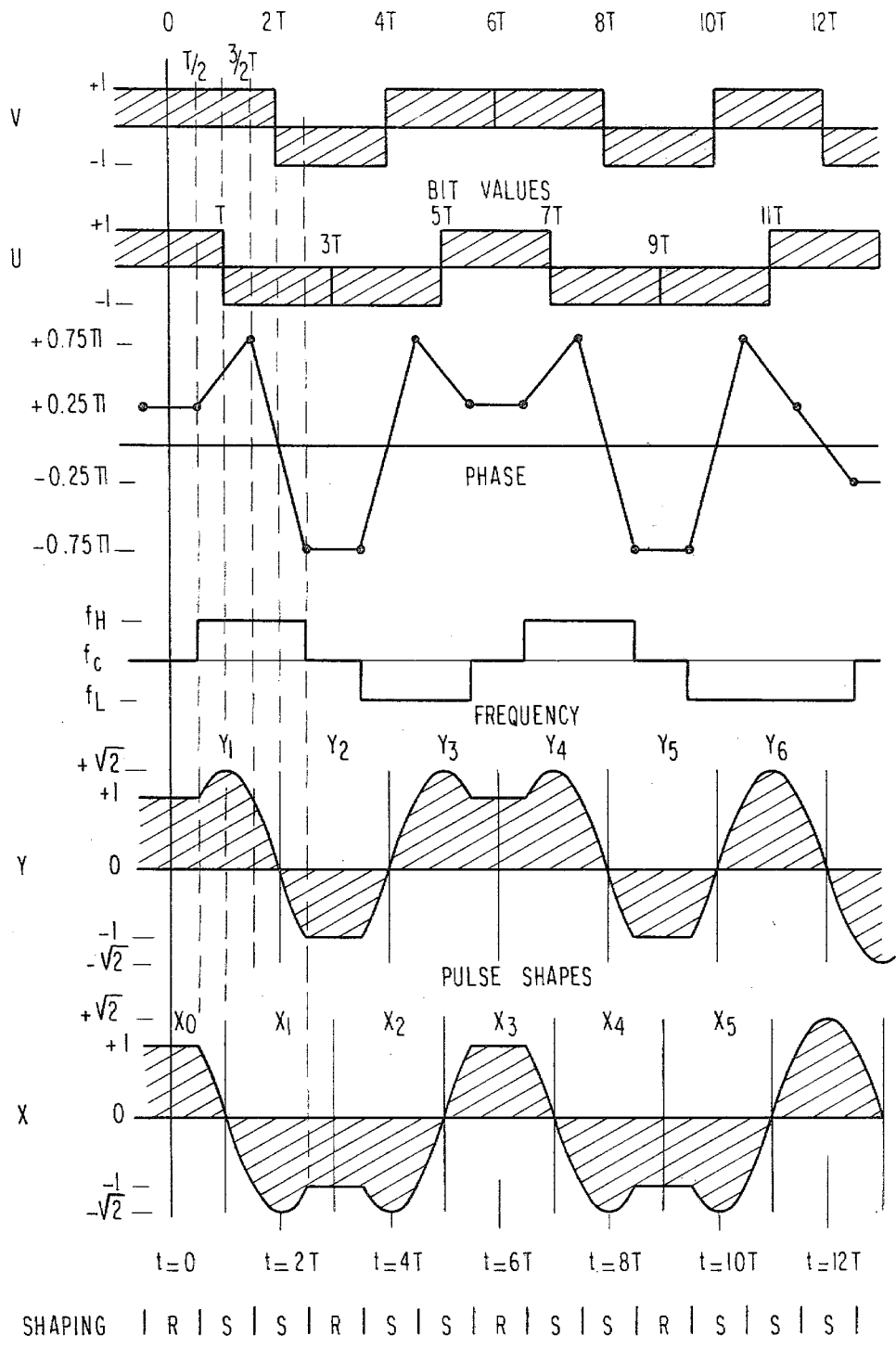
FIG. 3 is an illustration of the FSOQ waveforms in accordance with the present invention.

FIG. 3 illustrates the waveforms for FSOQ. The information is conveyed by $\pm 1$ bit streams U and V that are offset in time relative to each other. Phase is determined at the center of each pulse, U or V, by the polarities of U and V. Hence, there are four possible phase states at the pulse centers. Between these locations, the phase makes linear transitions between its states at successive points. Thus, the frequency corresponds to whether the phase is being advanced, retarded, or held constant. In order to produce the correct frequencies and phases, the modulator must have quadrature modulation components X and Y with the proper magnitudes, shapes, and polarities. Thus, X and Y must be generated from knowledge of the U and V bit values.

The scheme for generating X and Y may be deduced simply by observing the waveforms in FIG. 3. In any interval centered about a possible bit transition point of either U or V ("transition test interval" shown by dashed lines), the pulse shapes for both X and Y are sinusoidal with peak magnitude of $\sqrt{2}$ if there is a bit transition, and rectangular with a magnitude of unity if there is no bit transition. Let $T=1/R_b$ represent a bit interval. Then $T_s=2T$ is a "quaternary" symbol interval.

Because U and V are staggered bit streams, the shapes for X and Y must be determined in each interval of length T. Note that the polarities of X and Y correspond directly to the polarities of U and V, respectively.

Figure 4:
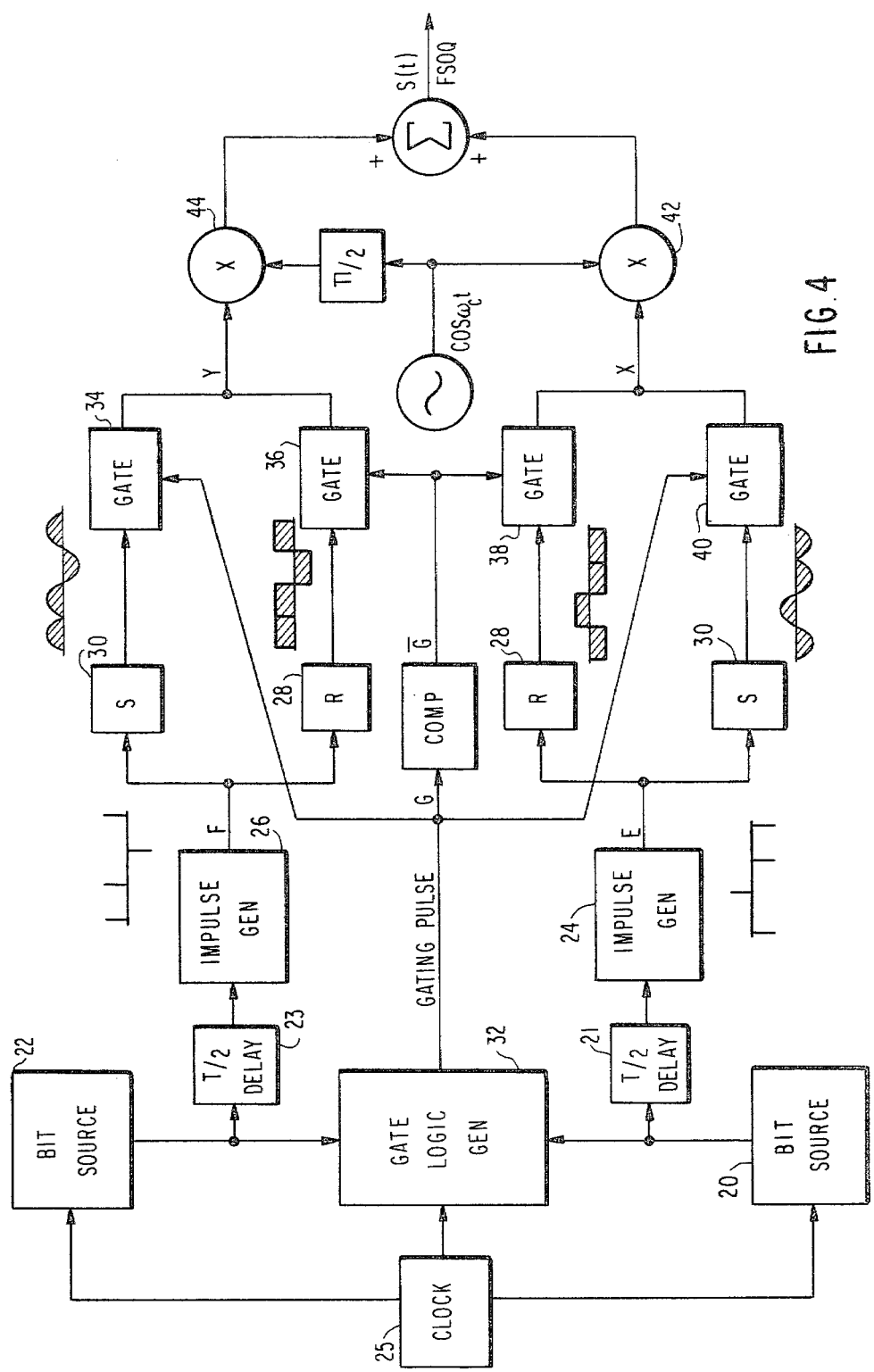
FIG. 4 is a block diagram of the apparatus for generating FSOQ in accordance with the present invention.

The FSOQ signal is generated as O-QPSK with selectable pulse shapes for the X and Y components. With reference to FIGS. 3 and 4, the original A and B bit sources 20 and 22, corresponding to bit streams U and V, provide the logical values "1" and "0" under the control of clock 25 to impulse generators 24 and 26 by way of T/2 delay circuits 21 and 23, respectively. The signals A and B (and U and V) each have transition periods of 2T and are offset from each other by period T. Impulse generators 24 and 26 provide two staggered impulse streams E and F, respectively, the polarities of the pulses corresponding to the A and B bit values. Shaping function generators 28 and 30 produce rectangular and sinusoidal pulse shape signals, respectively, the polarity of the signals corresponding to the polarities of the incoming pulse streams E and F.

Gate Logic Generator 32 is provided to detect the presence of a bit transition in either the A or B data during a "transition test interval" of period T surrounding each of the bit transition times, as illustrated by the dashed lines in FIG. 3. Gate Logic Generator 32 provides the logical function:

(Value of $A_n$+Value of $A_{n+1})_{mod2}$+(Value of $B_n$+Value of $B_{n+1})_{mod2}=G$, Since the values of A and B are either 0 or 1, $A_n+A_{n+1}$, modulo 2, can be 1 over the transition test interval only if there has been a transition in the value of A. Thus, a transition will produce gate signal $G=1$, and the sinusoidal signal will be genrated from gate 40, for example. The state of the logic in generator 32 is reset for each test interval period from timing information from clock 25.

The bit sources A and B are delayed relative to gating pulse G by T/2 in circuits 21 and 23 so that the detection by generator 32 performed at the middle of the transition test interval results in the chosen pulse shape for the entire transition test interval. For example, between times T/2 and 3T/2, generator 32 will generate $G=1$ at time T and the sinusoidal pulse shape for X and Y will be generated throughout the entire interval T/2 to 3T/2 by virtue of the delay circuits 21 and 23. The exact delay may of course vary from T/2 in accordance with race conditions from sources 20 and 22 to gates 34–40.

The signals X and Y are delivered to mixers 42 and 44 where they modulate a carrier signal $\cos \omega_c t$ in phase quadrature. The modulated signals are added to provide the FSOQ transmission signal S(t). The FSOQ transmission is represented by:

$$S(t) = \sqrt{C} \, [X \cos(2\pi f_c t) + Y \sin(2\pi f_c t)],$$

which signal has a constant amplitude envelope.

Reception of FSOQ

Figure 5:
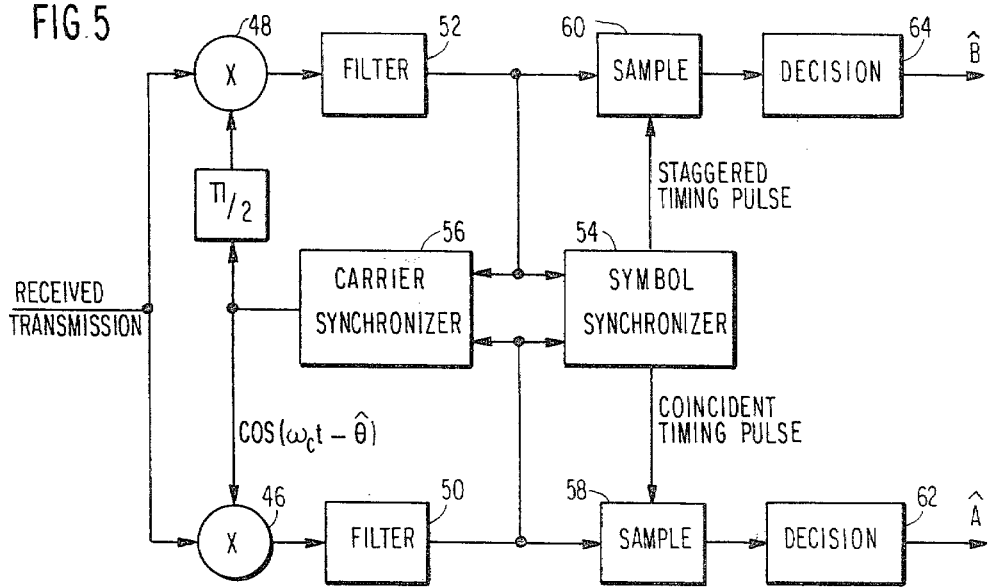
FIG. 5 is a block diagram generally illustrating the receiver configuration for detection of FSOQ as a form of O-QPSK.

FSOQ can be demodulated and detected as a special case of O-QPSK using the demodulator circuit illustrated in FIG. 5. The received transmission is applied to quadrature mixers 46 and 48, the outputs of which are applied to respective filters 50 and 52. Since FSOQ pulses can take on different shapes, filtering prior to bit decisions can be optimum only with respect to one pulse shape. Average bit error probability is minimized by optimizing filters 50 and 52 for the pulse shape of least energy. This pulse shape is rectangular in a region of width T centered about the middle of the pulse, sinusoidal for the two end parts of length T/2 each, and illustrated as Pulse Number 5 in FIG. 7. The total pulse width for either of the staggered FSOQ components is 2T.

Synchronizers 54 and 56 for bit timing and carrier phase respectively, are required for synchronous, coherent detection of FSOQ, and provide phase information to mixers 46, 48 and timing information to sampling circuits 58 and 60. Bit decision circuits 62 and 64 detect one's or zero's to provide output bit streams A and B.

Synchronizers designed for O-QPSK may perform satisfactorily. The appropriate type of synchronizer would depend on whether FSOQ is to be used for continuous or burst operation. In either case, the synchronizer would employ filters at the 3 FSOQ tones or at harmonics of these tones.

Figure 6:
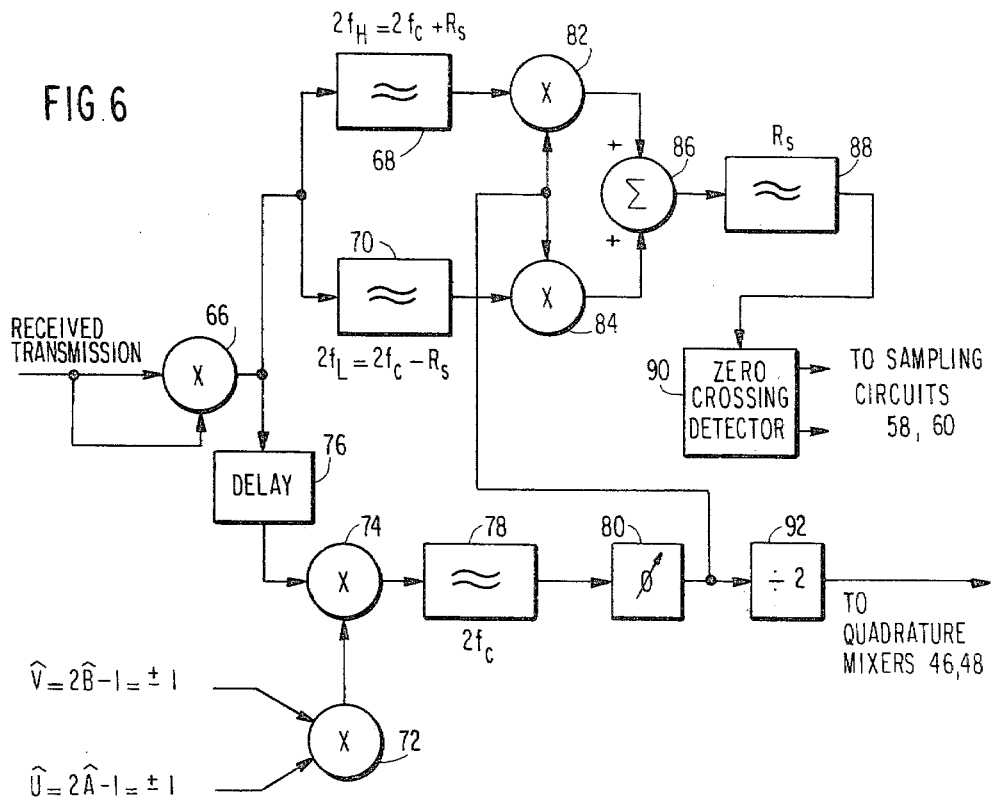
FIG. 6 is a block diagram of the FSOQ synchronizer circuit in accordance with the present invention.

FIG. 6 illustrates a synchronizer configuration for FSOQ. Squaring of the received transmission (after filtering) is provided at mixer 66 for frequency doubling. All information with respect to bit timing is related to the use of frequencies $f_H$ and $f_L$ for phase shifting. Hence, filters 68 and 70 centered at $2f_H$ and $2f_L$ respectively, capture the energy of the squared signal that is useful for bit timing. FSOQ can take on any of 4 phase states relative to the carrier frequency $f_c$. Thus, squaring removes only one-half of the modulation. Therefore, feedback of bit decisions (Decision Feedback, DFB) is depicted in FIG. 6 as a method to obtain an unmodulated carrier component at $2f_c$. The decision feedback circuitry comprises mixers 72 and 74. The mixer 72 multiplies the signals U and V representing the transformation of bit sequences A and B to ±1 from 1 or 0. The output of mixer 72 is applied to mixer 74 whereby the received transmission is demodulated by +1 or −1 in order to remove the remaining modulation. The output of mixer 66 is applied to mixer 74 via delay means 76 which provides for proper time alignment of the decision feedback. Thus, the signal energy useful for carrier synchronization is captured by filter 78 centered at $2f_c$.

The output of filter 78 centered at $2f_c$ is used to extract a timing waveform for the outputs of the two other filters 68 and 70. The output filter 78 is applied to mixers 82 and 84 through phase shifter 80 which adjusts for phase coherence. The outputs of filters 68 and 70 are applied to the second inputs of mixers 82 and 84, the outputs of which are combined in adder 86 and delivered to filter 88 to provide a timing waveform $R_s$. The timing waveform $R_s$ has a frequency of $R_b/2$ or one-half of the modulation bit rate. Thus, zero crossing detector 90 detects zero crossings with positive slopes to designate locations of timing epochs for one of the staggered bit sequences, while detecting zero crossings with negative slopes to designate timing epochs of the other modulation bit stream. The outputs of zero crossing detector 90 are applied to samplers 58 and 60.

Since the carrier reference is obtained at $2f_c$, frequency division by a factor of 2 in divider 92 is necessary to obtain a carrier phase reference for coherent detection. The frequency division results in a 2-state phase ambiguity of the carrier reference that must be resolved unless differential coding is employed to convey bits in the form of phase differences rather than by absolute phase.

FSOQ Power Spectrum

In principle, bandwidth reduction of digital FM transmissions can be accomplished by making the frequency shift a function of several preceding bits as well as of the present information bit. Use of such memory to reduce bandwidth results in correlation of phase over several symbols. Such mapping of message bits into the signal waveform is sometimes referred to as "correlative level coding". See Adam Lender, "Correlative Level Coding for Binary Data Transmission," IEEE Spectrum, Vol. 3, February 1966, pp. 104–115. Tamed FM uses the memory of two previous bits in determining which one of five possible phase shifts will be selected.

The MSK spectrum can be reduced by correlative coding. "Duo-binary" is the name given to the simplest such scheme. For duo-binary coding, the signal level is dependent upon the sum of the present bit value and the previous bit value, where the bit values are ±1. Hence, duo-binary coding results in three levels from a binary input. For duo-binary MSK, see Adam Lender, "A synchronous Signal With Dual Properties for Digital Communications", Vol. COM-13 IEEE Transactions on Communication Technology, No. 2, June 1965, pp. 202–208. There will be three frequencies rather than two. These will be the two MSK tones $f_L = f_c - R_b/4$ and $f_H = f_c + R_b/4$, plus a third tone at $(f_H + f_L)/2 = f_c$. Thus, duo-binary MSK has the 3 tones of FSOQ.

Not only do FSOQ and duo-binary MSK have the same tones, but the resulting signals are mathematically identical. The only difference between FSOQ and duo-binary MSK is the method of signal generation. Duo-binary MSK is generated as digital FM. It is difficult to achieve accurate phase shifts for digital FM, so that such an implementation is not suitable for either high speed signalling or for coherence over many symbols, which is necessary for deriving the synchronizer references required for synchronous, coherent detection. The generation of FSOQ as amplitude modulation of quadrature carriers with staggered bit timing is suitable for both high-speed signal generation and the maintenance of phase coherence over many symbol intervals.

Figure 12:
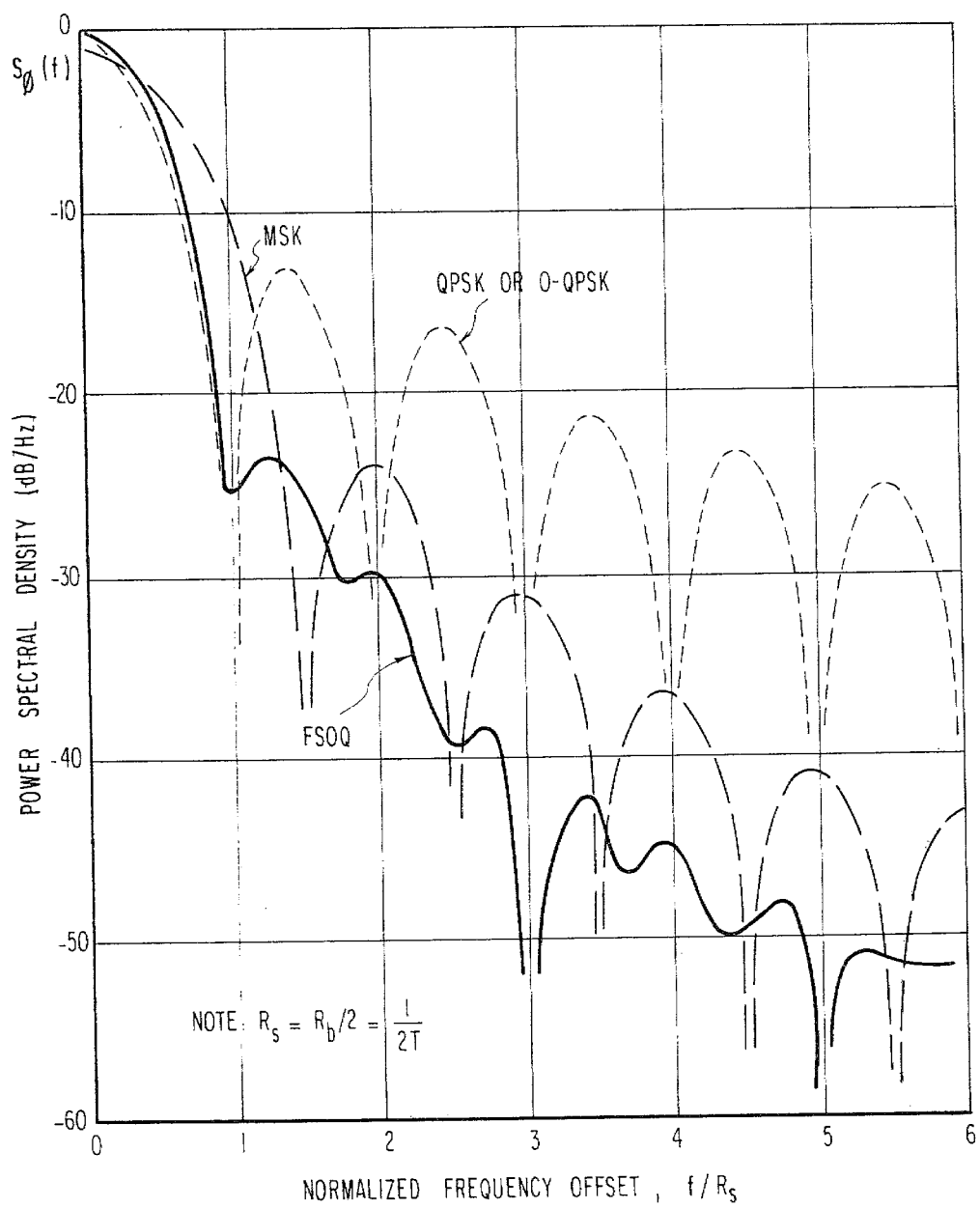
FIG. 12 is a graph illustrating power spectra of FSOQ, duo-binary MSK, and unfiltered QPSK and offset QPSK.

As obtained from G. J. Garrison, "A Power Spectral Density Analysis for Digital FM", IEEE Transactions on Communications, Vol. COM-23, No. 11, November 1975, pp. 1228–1243, the power spectrum of duo-binary MSK is shown in FIG. 12. Because FSOQ has the same theoretical signal structure as duo-binary MSK, the spectrum is the same for FSOQ. Also shown in FIG. 12 are the power spectra for MSK and unfiltered QPSK. Unfiltered offset QPSK has the same power spectrum as unfiltered QPSK. All three power spectra are calculated based on unity power P and unity quaternary symbol rate $R_s$.

The power spectrum of each signal type may be truncated by suitable filtering in order to restrict the signal spectrum to an allocated frequency band. However, most of the signal energy must be passed by such filtering or otherwise the signal properties will be significantly altered. As can be seen from FIG. 12, MSK requires about 50% more bandwidth than QPSK to pass most of the signal energy. It is also evident from FIG. 12 that FSOQ requires more bandwidth than QPSK but significantly less bandwidth than MSK.

Filtered QPSK is quite bandwidth efficient for linear channels. However, regrowth of spectral sidelobes by QPSK when passed through a nonlinearity cause it to require bandwidths comparable to that of MSK for some nonlinear channels. Therefore, the use of FSOQ can lower bandwidth requirement in such instance.

Theoretical Performance

Detection performance can be evaluated mathematically for FSOQ transmitted over a channel that is ideal except for additive Gaussian noise. Probability of bit error for detection is a function of the geometrical distance between the two possible signal points. For a distance d, the probability of bit error is:

$$P(d) = \phi \left[ \frac{d^2}{2N_o} \right]^{\frac{1}{2}}$$

where $N_o$ is the single-sided noise density and $\phi$ is the normalized inverse Gaussian distribution function defined by:

$$\phi[\mu] \triangleq \frac{1}{\sqrt{2\pi}} \int_\mu^\infty e^{-v^2/2} dv$$

In the detection of FSOQ as a special case of O-QPSK, the distance d is dependent upon the pulse shape. The pulse shape is in turn dependent upon the bit sequences. The middle half of any pulse has either a rectangular shape with height equal to $\pm\sqrt{E_b R_s}$ or a sinusoidal shape that peaks at $\pm\sqrt{2E_b R_s}$, where $R_s=R_b/2=1/(2T)$ is the quatenary signalling rate. In this middle section, the pulse shape for either quadrature component has a rectangular shape when the two adjacent pulses of the other quadrature component have the same polarity. The sinusoidal pulse shape of a quadrature component occurs when there is a transition between the two adjacent bits of the other quadrature component. For the first fourth and the last fourth of each bit, pulse shape is dependent upon whether there was a transition between this bit and the adjacent bit of the same quadrature component of FSOQ. All of the pulse shapes may be deduced by observing the waveforms of FIG. 3. There are a total of eight pulse shapes, corresponding to the eight combinations of transition or no transition between adjacent pulses on both quadrature components.

FIG. 7 illustrates the distances d corresponding to all eight possible shapes of FSOQ pulses. For ideal coherent detection of binary antipodal vectors, such as for ideal BPSK or QPSK, the distance between binary signalling components is $d_a=2\sqrt{E_b}$. Note that distance is twice the square-root of the bit energy. In FIG. 7, the eight distances for the eight pulse shapes are normalized to $d_a$.

Figure 8:
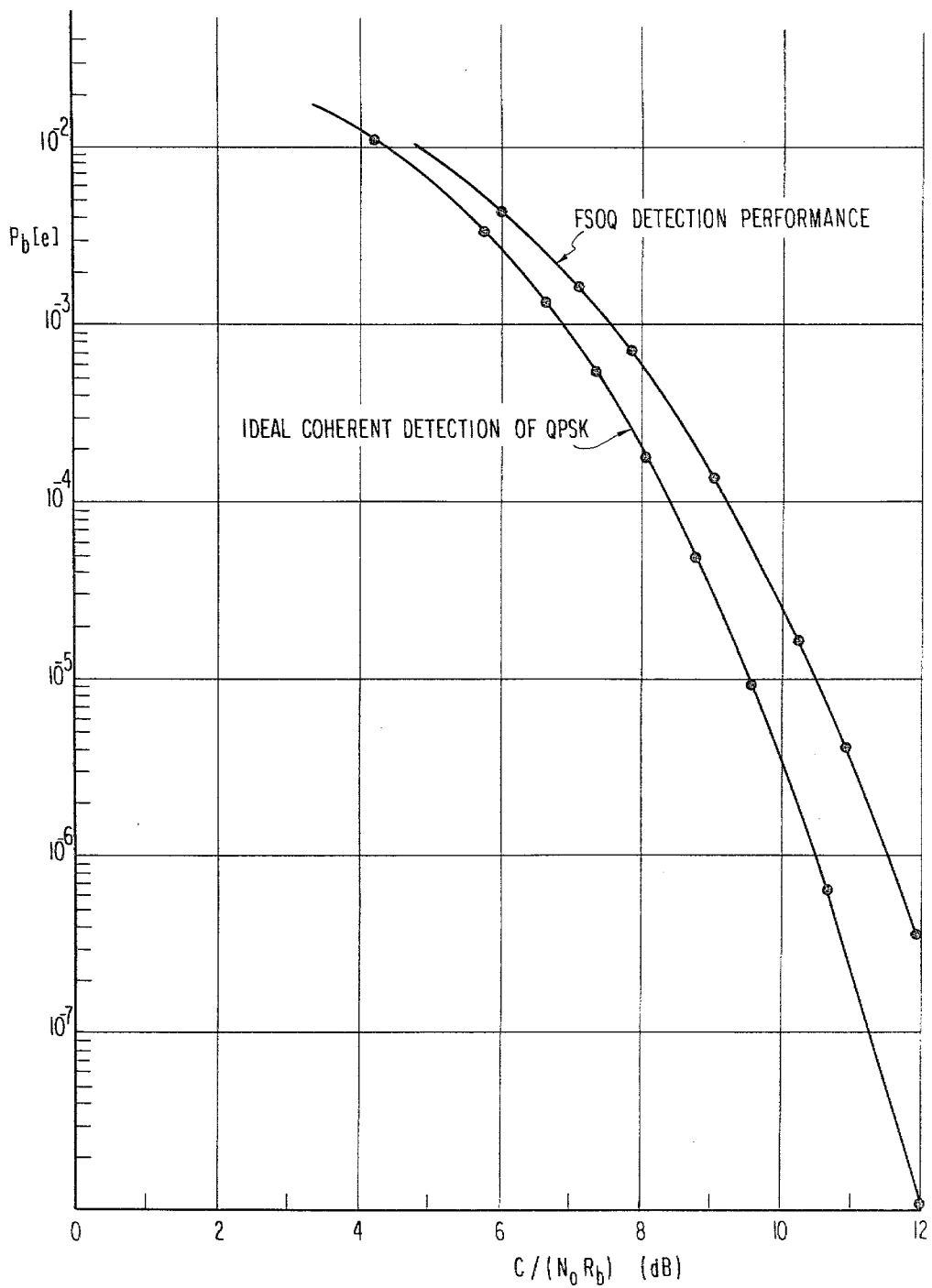
FIG. 8 illustrates the average probability of bit error for FSOQ.

The distances in FIG. 7 are useful only when matched filtering is performed. In practice, a single filter is ordinarily used for all pulse shapes. Thus, the filter may be matched to only one pulse shape. Best performance is obtained if the filter is matched to the pulse shape that yields the smallest distance. Note that the probability of bit error will be different for different pulse shapes. Table 1, below, lists the theoretical detection performance for each FSOQ pulse shape relative to ideal coherent detection of binary antipodal vectors. A minus sign corresponds to a gain (in decibels), while a positive sign for performance corresponds to a loss relative to binary antipodal signalling. The receiving filter is assumed to be matched to the most critical pulse shape, that which is sinusoidal on both ends but rectangular in the middle. This pulse yields a loss of about 1.7 dB in detection. However, the overall probability of bit error is the average of the bit error probabilities for each pulse shape. FIG. 8 illustrates the average probability of bit error for FSOQ. Because other pulse shapes produce higher energy than the critical pulse shape, the performance loss is less than 1.7 dB. From FIG. 9, it appears that the loss is only about 0.8 dB for an average bit error probability $P_b$ of $10^{-4}$ and about 1.0 dB when $P_b=10^{-6}$.

TABLE 1

| Pulse Number | Detection Performance |
|---|---|
| 0 | +0.7dB |
| 1 | +1.1dB |
| 2 | −0.7dB |
| 3 | −0.3dB |
| 4 | +1.1dB |
| 5 | +1.7dB |
| 6 | −0.3dB |
| 7 | +0.1dB |

The loss in FSOQ detection on a bit-by-bit basis is seen to be caused by different pulse shapes and energies. These pulse shapes are a function of the bit sequences in a dependent manner similar to that caused by intersymbol interference when filtering is used to spectrally band-limit any type of transmission, such as QPSK. Therefore, for detecting filtered signals, there is also a loss relative to ideal binary antipodal signaling because of intersymbol interference that results in different pulse shapes with various energy levels.

Whereas the various pulse shapes for FSOQ lower the minimum distance on a bit-by-bit basis, the strong dependency of pulse shape to bit pattern can be an advantage with respect to minimum free distance (MFD). MFD refers to the minimum distance between the signalling points for the correct bit sequence and the incorrect sequence. This MFD or path distance can be larger than the minimum distance for a single bit. From FIG. 2, it is seen that there are two adversary paths of minimum free distance $d_f$ with respect to the correct path. These adversary paths depart from the correct path with a linear phase shift of $\pm\pi/2$ radians over a bit interval. Then, the phase separation remains at $\pi/2$ for one bit interval. Finally, a linear phase shift of $\pm\pi/2$ over a bit interval results in the adversary path converging with the correct path.

Total squared distance is the integral of squared distance over the time interval of interest $$d_f^2 = \int_{t_1}^{t_2} d^2(t)\, dt.$$

For the paths with minimum free distance in FIG. 2, the distance may be computed separately for each of the three bit intervals that the adversary path differs from the correct path. Thus, $$d_f^2 = d_1^2 + d_2^2 + d_3^2$$

Over the middle interval, the adversary paths are at a constant phase separation of $\pi/2$ radians from the correct path. Thus, there is an orthogonal relationship, and $$d_2^2 = 2E_b$$

During both the first and last interval of length T, the adversary paths change phase linearly with respect to the correct path. Hence, the distance changes as a function of $\sin \theta$, where $\theta$ has a range of 0 to $\pi/2$. It follows that:

$$d_1^2 = d_3^2 = 2E_b \frac{2}{\pi} \int_0^{\pi/2} \sin^2 \theta \, d\theta.$$

But, $$\sin^2 \theta = \tfrac{1}{2} - \tfrac{1}{2} \cos 2\theta.$$

Also, the integral of $\cos 2\theta$ over the range of $\theta$ from 0 to $\pi/2$ is zero. It follows that:

$$d_1^2 = d_3^2 = E_b.$$

Therefore, the minimum free distance for the FSOQ phase trellis is readily seen to be $2\sqrt{E_b}$:

$$d_f^2 = d_1^2 + d_2^2 + d_3^2 = 4E_b.$$

For a bit rate of $R_b$, an FSK bit interval is $T = 1/R_b$. However, detection on a bit-by-bit basis for FSOQ is done by observing a quadrature component over an interval of 2T. The use of path decoding allows the minimum free distance of $d_f = 2\sqrt{E_b}$ to be obtained from adversary paths that extend over an interval of 3T. Note that $d = 2\sqrt{E_b}$ is also the distance for binary antipodal signaling or ideal coherent BPSK and QPSK. Thus, use of a Viterbi algorithm for maximum-likelihood path decoding of FSOQ could in theory yield the same performance as QPSK for an ideal additive white Gaussian noise channel.

Simulation Results

Computer simulations have been run to evaluate the performance of FSOQ communications over a nonlinear satellite channel. The simulated channel was given the characteristics of INTELSAT IV. The nonlinear response of the simulated high power amplifier (HPA) is given by FIG. 9. Also, the nonlinear travelling wave tube amplifier (TWTA) response is shown in FIG. 10.

A transmit filter was sometimes used in the simulations to band-limit the signal spectrum to that of the INTELSAT IV channel. The simulated filter was a 6-pole Butterworth design with equalization of the group delay. Since the simulated channel has a frequency spacing of 40 MHz per channel and the transmission rate was 60 Mbit/s, the ratio of channel spacing $B_c$ to "quaternary" symbol rate $R_s = R_b/2$ is 1.33. The 3-dB bandwidth $B_3$ of the filter should correspond to a $B_3 T_s$ value less than 1.33, where $T_s = 1/R_s$. The $B_3 T_s$ was adjusted to values of 1.20, 1.30, and 1.40 for the simulation runs.

Average probability of bit error $P_b$ was determined for coherent detection with ideal carrier reference and fixed symbol timing. The timing was selected to sample at what was thought to be the best location, the midpoint of each bit interval. However, this location is best only when the channel introduces no delay distortion. It was discovered that sometimes the performance was slightly improved by moving the sampling point off the mid-bit location.

$P_b$ was obtained for several types of receiver filtering. Primarily, three types of weighted integrate-and-dump (I&D) were used. These weighted I&D operations were used to match three pulse shapes: rectangular, half-cycle sinusoid, and a mixture of these two shapes. In this mixture, the first and last quarters of the pulse are sinusoidally shaped and the middle half is flat weighed or rectangular. This "sinrec" shaping is that of the FSOQ pulses which have the least energy. It should be noted that both the spectral restriction and the nonlinearity of the channel will distort the FSOQ pulses. Hence, it is not at all obvious as to what pulse shapes exist at the receiver after passing through the satellite channel. Therefore, it is necessary to match to different pulse shapes in order to discover the best choice.

The rectangular, sinusoidal, and sinrec filter shapes extended over an interval of 2T that includes only the desired pulse interval. It is sometimes useful to use a filter with an impulse response that extends into adjacent symbols. Such an overlapping response is used for "equalization" of intersymbol interference (ISI). Without this extended impulse response, different pulse shapes yield various voltage levels in the absence of noise. Detection performance can sometimes be improved somewhat by an extended response that boosts the output for weak pulses at the expense of a decreased output for stronger pulses. Small pulses result from transitions that round its sides. Hence, pulses of low energy content are located between pulses that have a common polarity opposite of the low energy pulse. Thus, the response of the filter with ISI equalization must change polarity as it extends into adjacent symbol intervals. The only extended pulse shape used in the simulations had rectangular shapes in both the main pulse interval and the adjacent pulse intervals. However, the response in the adjacent intervals had a negative polarity and a magnitude of only 5 percent of the main portion of the impulse responses. This filter is referred to as "extrec" with −0.05 equalization level. It should be noted that the extension of the impulse response for equalization increases the noise bandwidth of the filter slightly.

FIG. 11 illustrates the impulse response or pulse shapes for weighted I&D filtering. Receiver filtering also sometimes included a 6-pole equalized Butterworth filter for matching when this filter was employed at the transmitter for spectral band limiting. The simulation results are given below in Table 2.

TABLE 2

Summary of Computer Simulation Results for FSOQ

| $B_3T_s$ of Transmit Filter | $B_3T_s$ of Receive Filter | Weighting for I&D | Detection Loss (dB) $P_b = 10^{-4}$ | $P_b = 10^{-6}$ |
|---|---|---|---|---|
| No Filter | No Filter | REC | 3.2 | 3.9 |
| | | SIN | 2.8 | 3.4 |
| | | SINREC | 2.7 | 3.3 |
| | | EXTREC | 2.7 | 3.2 |
| No Filter | 1.5 | REC | 4.0 | 4.7 |
| | | SIN | 3.0 | 3.5 |
| | | SINREC | 3.1 | 3.7 |
| | | EXTREC | 3.0 | 3.7 |
| 1.4 | 1.4 | REC | 4.6 | 5.5 |
| | | SIN | 3.5 | 4.1 |
| | | SINREC | 3.6 | 4.3 |
| | | EXTREC | 3.5 | 4.1 |
| 1.3 | No Filter | REC | 5.0 | 5.8 |
| | | SIN | 3.9 | 4.4 |
| | | SINREC | 3.9 | 4.5 |
| | | EXTREC | 3.7 | 4.3 |
| 1.3 | 1.3 | REC | 5.1 | 6.0 |
| | | SIN | 3.7 | 4.4 |
| | | SINREC | 3.9 | 4.6 |
| | | EXTREC | 3.7 | 4.4 |

The tight bandwidth restriction plus the nonlinearities of the HPA and TWTA when operated at power saturation caused fairly large detection losses. In particular, the bandwidth restriction was severe enough to round off pulses so that there were no rectangular sections of pulses, the pulses being distorted from the original pulse shapes shown in FIG. 7. Consequently, detection performances were usually worse for the case of a weighted I&D matched to a rectangular pulse. Results for the other weightings did not differ significantly.

Simulations for FSOQ were made both with and without a transmit filter. The bandwidths used for the transmit filter correspond to $B_3T_s$ values of 1.3 and 1.4. As seen from Table 2, detection results were significantly better without the bandwidth restriction of a transmit filter. Of course, the adjacent channel interference might be a problem without the filter. However, losses of less than 3 dB for the single-channel case were obtained for FSOQ at $P_b = 10^{-4}$ without the transmit filter. Use of a receive filter in addition to weighted I&D degraded performance when there was no transmit filter. When the transmit filter was employed, there was no significant difference in detection performance with or without a corresponding receive filter.

Various changes, additions and omissions of elements may be made within the scope and spirit of the present invention. It is to be understood that the invention is not limited to specific details and examples and preferred embodiments shown and described herein.

I claim:

1. A method of modulating a signal for transmission comprising:

generating first and second binary bit sequences related to first and second data sequences respectively, said first and second binary bit sequences being offset in time with respect to each other;

selectively generating one of (i) a sinusoidal signal, and (ii) a rectangular signal, for selected portions of said first and second binary bit sequences, to produce respective third and fourth modulation sequences, the polarities of said sinusoidal and rectangular signals selected as a function of the polarities of said first and second binary bit sequences, said one of said sinusoidal and rectangular signals being selected as a function of bit transitions of said first and second binary sequences; and modulating a carrier signal with said third and fourth modulation sequences to provide a transmission signal.

2. The method of claim 1 wherein said transmission signal is frequency modulated and has a substantially constant envelope.

3. The method of claims 1 or 2 wherein the steps of selectively generating comprise:

generating first and second sinusoidal signal sequences as a function of said first and second binary bit sequences, respectively;

generating first and second rectangular signal sequences as a function of said first and second binary bit sequences, respectively:

detecting bit transitions of said first and second binary bit sequences to provide a gating signal; and selectively modulating said carrier with one of (i) said first and second rectangular signal sequences and (ii) said first and second sinusoidal signal sequences in accordance with said gating signal.

4. The method of claim 3 wherein the step of detecting bit transitions includes detecting the absence of bit transitions over a preselected time period in both of said first and second binary bit sequences to produce a first gate signal, and detecting the presence of at least one bit transition over said preselected time period in at least one of said first and second binary bit sequences to produce a second gate signal.

5. The method of claim 4 wherein said carrier is modulated (i) with said first and second rectangular sequences in response to said first gate signal, and (ii) with said first and second sinusoidal sequences in response to said second gate signal.

6. A method of demodulating a received signal modulated with a plurality of pulse shapes representing a bit pattern comprising:

combining said received signal with a synthesized carrier signal to provide a baseband signal;

filtering said baseband signal to provide a filtered signal;

sampling said filtered signal in accordance with a signal synchronized with said bit pattern to detect the values of said bit pattern; and optimizing said filtering of said baseband signal for the pulse shape having the least energy of said plurality of pulse shapes.

7. The method of claim 6 wherein said step of combining is performed in phase quadrature to produce in-phase and quadrature baseband signals, and said steps of filtering and sampling are provided for both of said in-phase and quadrature signals.

8. An apparatus for modulating a signal for transmission comprising:

means for generating first and second binary bit sequences related to first and second data sequences, respectively, said first and second binary bit sequences being offset in time with respect to each other;

means for selectively generating one of (i) a sinusoidal signal, and (ii) a rectangular signal, for selected portions of said first and second binary bit sequences to produce respective third and fourth modulation sequences, the polarities of said sinusoidal and rectangular signals being selected as a function of the polarities of said first and second binary bit sequences, said means for selectively generating selecting said one of said sinusoidal and rectangular signals as a function of bit transitions of said first and second binary sequences; and modulating means for modulating a carrier signal with said third and fourth modulation sequences to provide a transmission signal.

9. The apparatus of claim 8 wherein said means for selectively generating comprises:

means for generating first and second sinusoidal sequences in response to said first and second binary bit sequences, respectively;

means for generating first and second rectangular signal sequences in response to said first and second binary bit sequences, respectively;

means for detecting bit transitions of said first and second binary bit sequences to provide a gating signal; and means for selectively delivering to said modulating means one of (i) said first and second rectangular signal sequences and (ii) said first and second sinusoidal signal sequences in accordance with said gating signal.

10. The apparatus of claim 9 wherein said means for detecting bit transitions detects the absence of bit transitions over a preselected period of time in both of said first and second binary bit sequences to produce a first gate signal, and further detects the presence of at least one bit transition over said preselected period of time in at least one of said first and second binary bit sequences to produce a second gate signal.

11. The apparatus of claim 10 wherein said means for selectively generating further comprises first gate means receiving said first gate signal, said first gate means passing said first and second rectangular signal sequences to said modulating means in response to said first gate signal; and second gate means receiving said second gate signal for passing said first and second sinusoidal signal sequences to said modulating means in response to said second gate signal.

12. The apparatus of claim 11 wherein said modulating means comprises:

first mixer means receiving at one input the selected one of (i) said first rectangular and (ii) said first sinusoidal signal sequences;

second mixer means receiving at one input the selected one of (i) said second rectangular and (ii) said second sinusoidal signal sequences;

said first and second mixers receiving at another input a carrier signal in phase quadrature; and signal combining means for combining output signals from said first and second mixer means to produce a signal for transmission.

13. A method of synchronizing a receiver with an incoming signal having a carrier reference signal modulated in accordance with a bit pattern to thereby provide said incoming signal with components having frequencies above, below and at the frequency of said carrier reference signal, said method comprising:

removing the modulation on said reference signal in accordance with a first function to provide a first reference signal;

mixing said first reference signal with signals related to said components having frequencies above and below the frequency of said carrier reference signal to provide first and second mixed signals, respectively; and combining said first and second mixed signals to provide a combined signal synchronized with said bit pattern.

14. The method of claim 13 further comprising: detecting the zero crossings of said combined signal to thereby provide a first sync signal in accordance with positive-going zero crossings, and a second sync signal in accordance with negative-going zero crossings.

15. The method of claims 13 or 14 further comprising transforming said first reference signal in accordance with an inverse of said first function to provide a coherent carrier reference.

16. The method of claim 15 wherein said first function includes a frequency doubling.

17. An apparatus for synchronizing a receiver with an incoming signal having a carrier reference signal modulated in accordance with a bit pattern to thereby provide said incoming signal with components having frequencies above, below, and at the frequency of said carrier reference signal, said method comprising:

means for removing the modulation on said carrier reference signal in accordance with a first function to provide a first reference signal;

means for mixing said first reference signal with signals related to said components having frequencies above and below the frequency of said carrier reference signal to provide first and second mixed signals, respectively; and means for combining said first and second mixed signals to provide a combined signal synchronized with said bit pattern.

18. The apparatus of claim 17 further comprising zero crossing detector means for detecting zero crossings of said combined signal to thereby provide a first sync signal in accordance with positive-going zero crossings and a second sync signal in accordance with negative-going zero crossings.

19. The apparatus of claims 17 or 18 further comprising means for transforming said first reference signal in accordance with an inverse of said first function to provide a coherent carrier reference.

20. The apparatus of claim 19 wherein said first function includes a frequency doubling.

* * * * *